United States Patent [19]

Niizawa

[11] Patent Number: 4,934,213
[45] Date of Patent: Jun. 19, 1990

[54] POWER TRANSMISSION APPARATUS

[75] Inventor: Yoshikazu Niizawa, Tochigi, Japan

[73] Assignee: Tochigifujisangyo Kabushiki Kaisha, Tochigi, Japan

[21] Appl. No.: 391,720

[22] Filed: Aug. 7, 1989

Related U.S. Application Data

[63] Continuation of Ser. No. 182,237, Apr. 15, 1988, abandoned.

[30] Foreign Application Priority Data

Apr. 20, 1987 [JP] Japan .............. 62-058589[U]

[51] Int. Cl.$^5$ .................................. F16H 1/44
[52] U.S. Cl. ................................ 475/86; 475/239
[58] Field of Search ................ 74/710.5, 711

[56] References Cited

U.S. PATENT DOCUMENTS

| | | | |
|---|---|---|---|
| 2,991,664 | 7/1961 | Bernotas | 74/711 |
| 3,788,166 | 1/1974 | Hart et al. | 74/710.5 |
| 3,886,813 | 6/1975 | Baremor | 74/711 X |
| 3,894,446 | 7/1975 | Snoy et al. | 74/710.5 X |
| 3,974,717 | 8/1976 | Breed et al. | 74/710.5 X |
| 4,263,824 | 4/1981 | Mueller | 74/710.5 X |
| 4,462,272 | 7/1984 | Roper | 74/711 |
| 4,644,823 | 2/1987 | Mueller | 74/710.5 |
| 4,679,463 | 7/1987 | Ozaki et al. | 74/710.5 X |
| 4,715,248 | 12/1987 | Gant | 74/710.5 |
| 4,776,234 | 10/1988 | Shea | 74/710.5 |
| 4,805,486 | 2/1989 | Hagiwara et al. | 74/710.5 |

Primary Examiner—Dirk Wright
Attorney, Agent, or Firm—Samuels, Gauthier & Stevens

[57] ABSTRACT

A power transmission apparatus comprises a device for transmitting power by frictional force between first and second rotary members rotated relative to each other; a device for pressing the power transmitting device in a direction of increasing frictional force; a drive device for driving the pressing device in the direction of increasing frictional force; and a stopper for restricting the movement of the drive device.

A differential apparatus comprises a differential casing rotatably supported by a differential carrier through a bearing, and having a differential mechanism; a device for restricting the differential of the differential mechanism by frictional force, the restricting device being disposed within the differential casing; a device for pressing the restricting device to control the frictional force in the differential mechanism; a drive device for actuating the pressing device; and a stopper for restricting the movement of the drive device, the stopper being disposed externally on the differential casing.

5 Claims, 3 Drawing Sheets

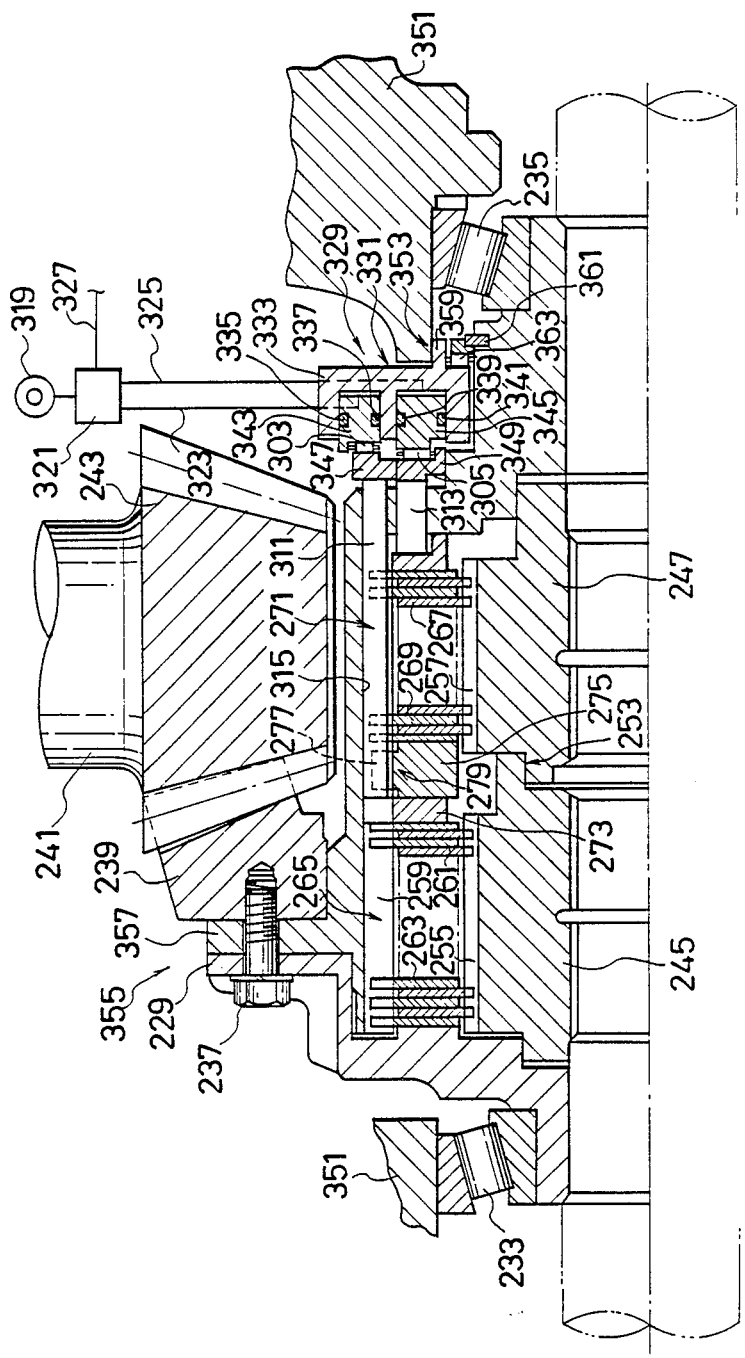

POWER TRANSMISSION APPARATUS

This is a continuation of copending application(s) Ser. No. 07/182,237 filed on 04/15/88 now abandoned.

The present invention relates to an improvement of a power transmission apparatus such as a differential apparatus for securing smooth operability of a vehicle by absorbing the difference in rotation of right and left wheels when the vehicle's direction is changed, such as when turning along a curve.

BACKGROUND OF THE INVENTION

Conventionally, when a vehicle's direction is changed, as when turning along a curve, a differential apparatus provides a differential for right and left wheels to secure a smooth performance. However, if one of the wheels slips on a road surface having a small coefficient of friction, such as a road in a swamp, the drive force cannot be structurally transmitted to the other wheel, and thus the vehicle cannot be moved out of the swamp. To solve this problem, the differential apparatus has a differential restricting mechanism for restricting the differential, which serves to move the vehicle out of the swamp when one of the wheels slips on a swampland road, the differential being generated between the right and left wheels.

The differential apparatus provided with such a differential restricting mechanism is disclosed in Japanese published patent 57-4536, for example, and is shown in FIG. 1.

In FIG. 1, a differential carrier 101 has a differential gear mechanism 102 therein, and rotatably supports a differential casing 104 of the differential gear mechanism 102 through a bearing 103. A cylindrical portion 105 is formed in the differential carrier 101. When an operating oil is supplied to the cylindrical portion 105, a piston 106 disposed within the cylindrical portion 105 presses, through a pressing member 107, frictional plates 108 disposed in the differential casing 104 as a differential control means. When the frictional plates 108 are pressed by the piston 106, the differential casing 104 and a side gear 109 of the differential gear mechanism 102 are integrally rotated, thereby restricting the differential between the right and left wheels.

However, in such a conventional differential apparatus having the differential restricting means 108, when the operating oil is supplied to the cylindrical portion 105, the piston 106 presses the frictional plates 108 through the pressing member 107 by the pressure of the operating oil. At this time, the differential casing 104 is pressed to the right in FIG. 1 together with the frictional plates 108. When the differential casing 104 is pressed in a rightward direction, the bearing 103 disposed between the differential casing 104 and the differential carrier 101 is also pressed to the right, so that an inner race 103a of the bearing 103 is pressed to the right. When the inner race 103a is pressed to the right, a roller 103b of the bearing 103 is rotated while being vibrated, thereby reducing the durability of the bearing 103.

Further, the conventional power transmission apparatus is large-sized, so the mechanical strength is low, and the design of the apparatus must be greatly changed to increase the rigidity. Moreover, vibrations tend to be generated in the apparatus.

SUMMARY OF THE INVENTION

To solve the problems mentioned above, an object of the present invention is to provide a compact power transmission apparatus having an improved mechanical strength without greatly changing the design of the apparatus.

Another object of the present invention is to provide a differential apparatus for improving the durability of a bearing disposed therein.

With the above objects in mind, the present invention resides in a power transmission apparatus comprising means for transmitting power by frictional force between first and second rotary members rotated relative to each other; means for pressing the power transmitting means in a direction of increasing frictional force; drive means for driving the pressing means in the direction of increasing frictional force; and stopper means for restricting the movement of the drive means.

The present invention also resides in a differential apparatus comprising a differential casing rotatably supported by a differential carrier through bearing means, and having a differential mechanism; means for restricting the differential of the differential mechanism by frictional force, said restricting means being disposed within the differential casing; means for pressing the restricting means to control the frictional force in the differential mechanism; drive means for actuating the pressing means; and stopper means for restricting the movement of the drive means, said stopper means being disposed externally on the differential casing.

BRIEF DESCRIPTION OF THE DRAWINGS

The present invention will be more apparent from the following description of the preferred embodiments thereof in conjunction with the accompanying drawings in which:

FIG. 3 is a cross-sectional view of a rear differential apparatus of a vehicle in another embodiment of the present invention.

DETAILED DESCRIPTION OF THE PREFERRED EMBODIMENTS

The preferred embodiments of the present invention will now be described in detail with reference to the drawings.

Figure 2:
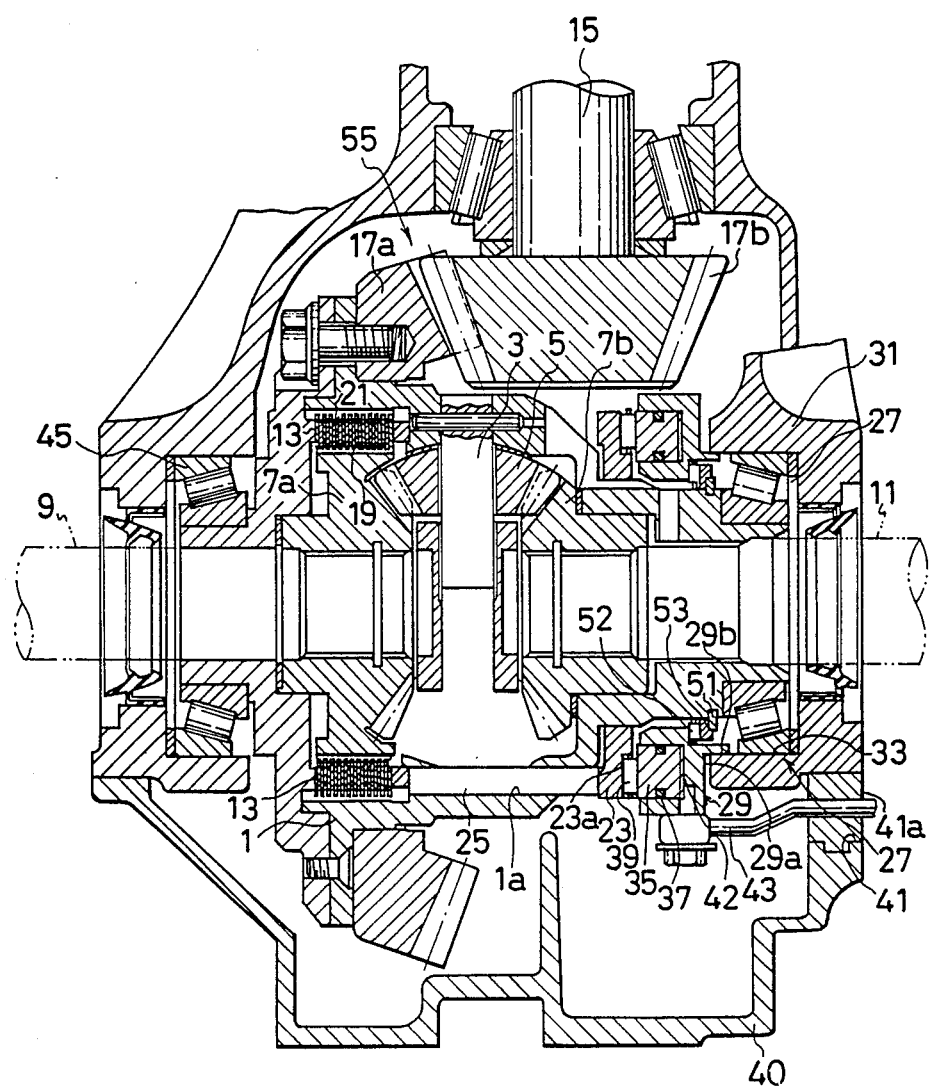
FIG. 2 is a cross-sectional view of a differential apparatus in accordance with an embodiment of the present invention.

FIG. 2 shows a differential apparatus in accordance with one embodiment of the present invention.

In FIG. 2, a pinion gear 5 is rotatably fitted onto a pinion shaft 3 approximately inserted to a central portion of a differential casing 1. Side gears 7a and 7b are disposed on the right and left hand sides of the pinion gear 5, and are engaged with the pinion gear 5. Output shafts 9 and 11 are fitted into the side gears 7a and 7b, and are respectively connected to left and right wheels which are not shown. A frictional clutch 13 is disposed between the differential casing 1 and the side gear 7a, and is composed of a plurality of clutch plates as a differential restricting means for restricting the differential by frictional force. A ring gear 17a is disposed in a flange portion arranged in the outer circumference of the differential casing 1 on one side of the pinion shaft 3, e.g., on the left hand side thereof. A drive pinion gear 17b is disposed at an end of an input shaft 15, and constitutes a hypoid gear together with the ring gear 17a. Accordingly, an input from the input shaft 15 is transmitted to the differential casing 1, and the differential apparatus is thereby driven.

The half 21 of the frictional plates of the frictional clutch 13 is movable by a thrust force, and is engaged with a spline in the inner circumference of the differential casing 1. The remaining half 19 of the frictional plates is movable by a thrust force, and is engaged with a spline in the outer circumference of a boss of the side gear 7a. The halves 21 and 19 of the frictional plates are alternately arranged with respect to each other in the axial direction.

A pressure ring or member 23 is movably fitted in the axial direction onto the outer circumferential surface of the differential casing 1, and can move in a direction of increasing frictional force to couple the frictional clutch 13 by pressing and moving the frictional plates 19 and 21 and forcing them to make contact with each other. The pressure ring 23 and the frictional clutch 13 are connected to each other through a push rod or pressure member 25 slidably inserted into a hole 1a formed along the axial direction of an output shaft 11 in the differential casing 1.

The differential casing 1 is rotatably supported at right and left ends thereof by a differential carrier 31 through bearings 45 and 27. An annular oil pressure cylinder 29 as a drive means is disposed between the bearing 27 and the pressure ring 23. A cylindrical portion 29a of the oil pressure cylinder 29 has a projecting portion 29b at the rear end thereof fitted into a bearing hole 33 of the differential carrier 31. A ring-shaped piston 35 opposite the pressure ring 23 is hermetically and slidably inserted into the cylindrical portion 29a of the oil pressure cylinder 29 through a seal member or O-ring 37.

An operating oil is supplied to an operating oil chamber 42 of the oil pressure cylinder 29, and the piston 35 is pressed to the left by the operating oil, and simultaneously the oil pressure cylinder 29 is pressed to the right. A stopper 51 for preventing the oil pressure cylinder 29 from moving to the right is disposed externally on the differential casing 1 on the right hand side of the oil pressure cylinder 29. A needle bearing 52 and an intermediate member 53 are disposed between the stopper 51 and the oil pressure cylinder 29.

A thrust bearing 39 is disposed between a front end face of the piston 35 and a rear end face of the pressure ring 23, and has a retainer on the inner circumference thereof rotatably engaged with a backward step portion 23a, of the pressure ring 23. The differential casing 1, the side gears 7a and 7b, and the pinion gear 3 constitute a differential gear mechanism 55 as a whole.

The differential gear mechanism 55 is disposed within the differential carrier 31, and an operating oil supply hole 41 is formed in a portion of the joining face between the differential carrier 31 and a differential cover 40 for maintenance disposed on the lower face side of the differential carrier 31. A cap 41a is fixed to the operating oil supply hole 41, and is made of an elastic member. An operating oil tube 43 is inserted into a generally central portion of the cap 41a, and is connected to the operating oil chamber 42 of the oil pressure cylinder 29. Accordingly, the operating oil supplied into the operating oil tube 43 is supplied to the operating oil chamber 42, and the piston 35 is slid by the pressure of the operating oil, thereby pressing the pressure ring 23. The pressure ring 23 presses the frictional clutch 13 through the push rod 25 in a direction of increasing frictional force.

The oil pressure cylinder 29 as an actuator for pressing the frictional clutch 13 is adjusted with respect to the supplied amount of the operating oil, and is controlled in operation based on road conditions by an unillustrated control system constituted by sensors, control circuits, regulators, etc.

The operation of the differential apparatus mentioned above will be described next.

Figure 1:
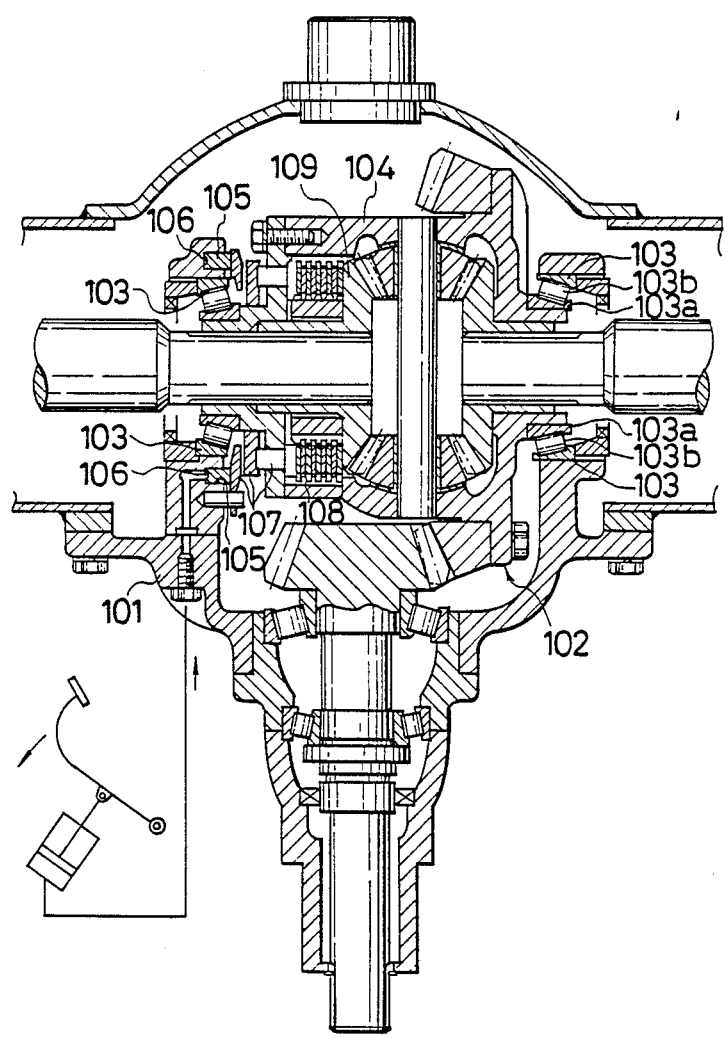
FIG. 1 is a cross-sectional view of a conventional differential apparatus.

When either the right or left wheel of a vehicle slips on a slippery surface such as swamp and a differential is generated therebetween during the operation of the vehicle, the differential of the differential gear mechanism 55 is restricted by the differential restricting means 13. Namely, the operating oil from an unillustrated oil pump, etc., is supplied to the operating oil chamber 42 from the operating oil tube 43. The piston 35 presses the pressure ring 23 by the pressure of the operating oil supplied to the operating oil chamber 42, thereby pressing the frictional clutch 13 through the pressure rod 25 of the pressure ring 23 in the direction of increasing frictional force, i.e., in the left direction in FIG. 1. When the frictional clutch 13 is pressed, the relative rotation of the side gear 7a and the differential casing 1 is restricted in accordance with the increase in the pressing force, thereby restricting the differential of the differential gear mechanism 55.

At this time, the piston 35 is pressed by the pressure of the operating oil supplied to the operating oil chamber 42, and simultaneously the oil pressure cylinder 29 is pressed by a reactive force in a direction opposite the direction of increasing frictional force, i.e., in the rightward direction in FIG. 2. Even when the oil pressure cylindrical portion 29 is pressed, the stopper 51 prevents the oil pressure cylinder 29 from being moved through the needle bearing 52 and the intermediate member 53.

When the stopper 51 is pressed by the cylindrical portion 29a in the direction opposite the direction of increasing frictional force, i.e., in the rightward direction, a force in the rightward direction is applied to the differential casing 1 since the stopper 51 is disposed in the differential casing 1. Simultaneously, the frictional force in the direction of increase, i.e., in the leftward direction, is applied to the differential casing 1 by the piston 35 through the pressure members 23 and 25, the frictional clutch 13, etc. Accordingly, the pressing force on the differential casing 1 by the cylindrical portion 29a in the rightward direction is cancelled out by the force of the piston 35 in the leftward direction. Thus, the pressing force in the direction of increasing frictional force can be greatly reduced with respect to the bearing 45, thereby improving the durability of the bearing 45.

Since the operating oil supply hole 41 is formed in a portion of the joining face between the differential carrier 31 and the differential cover 40, the differential carrier 31 used in the differential apparatus disposing the differential restricting means 13 therein has the same structure as a differential carrier having no operating oil supply hole, i.e., the same structure as a differential carrier used in a differential apparatus having no differential restricting means. Accordingly, the differential carrier 31 used in the differential apparatus can be used in the differential apparatus having no differential restricting means. As a result, it is sufficient to manufacture only one differential carrier 31, so that the cost of the differential carrier 31 can be reduced and the operating oil supply hole 41 can be easily formed.

As mentioned above, in accordance with the present invention, a drive reactive force of a drive means for restricting a differential is absorbed within a differential casing to prevent any drive reactive force from being applied to a bearing disposed between a differential carrier and the differential casing, thereby improving the durability of the bearing.

FIG. 3 shows another embodiment of the present invention. In FIG. 3, a ring gear 239 is engaged with a drive pinion gear 243 integrally formed at the rear end of a drive pinion shaft 241 connected to a propeller shaft of a vehicle. Splines 255 and 257 are disposed in the outer circumferences of hub members 245 and 247 fitted to each other in a fitting portion 253 and rotatable relative to each other. A spline 259 is disposed in the inner circumference of a casing body 357. A leftward frictional clutch 265 is composed of a plurality of frictional plates 261 and 263 alternately arranged with respect to each other and respectively engaged with splines 255 and 259 in the rotational direction. A rightward frictional clutch 271 is composed of a plurality of frictional plates 267 and 269 alternately arranged with respect to each other and respectively engaged with a spline 257 and an upper spline in the rotational direction. A pressure ring 273 is movably engaged with the spline 259 of the casing body 357 in the axial direction, and contacts the right end of the left frictional clutch 265. A partition member 275 is arranged between the pressure ring 273 and the right frictional clutch 271, and is fixed to the inner circumference of the casing body 357.

Actuators 329 and 331 are composed of piston members 343 and 345 slidably engaged with a common cylindrical member 333 and pressure chambers thereof through respective O-rings 335, 337, 339 and 341. The piston members 343 and 345 contact ring-shaped pressing members 347 and 349 through needle bearings 303 and 305. Push rods 311 and 313 are respectively welded to the pressing members 347 and 349. The cylindrical member 333 consists of a member which is separate from a differential carrier casing 351, and is rotatably engaged with the carrier casing 351 in a shaft support portion 353. A casing 355 is composed of a cover 329 and the casing body 357, and a ring-shaped stopper 359 is disposed on the casing body 357 such that the rightward movement of the stopper 359 is restricted by a stopper ring 361. The stopper 359 contacts the cylindrical member 333 through a needle bearing 363. Accordingly, the left side face of the stopper 359 is a face for receiving a thrust force which is a reactive pressing force when the actuators 329 and 331 are actuated.

Oil pressure is transmitted to the pressure chambers disposed in the actuators 329 and 331 from an oil pressure source 319 through oil conduits 323 and 325 and a control valve device 321 manually operated through a signal line 327. The actuators 329 and 331 are externally operated to separately couple and decouple the respective frictional clutches 265 and 271.

Thus, the thrust force of the actuators 329 and 331 is interrupted by the stopper 359, and is not applied to a bearing 235 and the carrier casing 351 so that the durability of the bearing 235 is not reduced and the carrier casing 351 is not deformed. Accordingly, it is not necessary to increase the rigidity of the carrier casing 351, and the increase of the weight thereof is thereby avoided. Further, the mechanical strength in engagement of the ring gear 239 and the drive pinion gear 243 is not reduced due to the deformation of the carrier casing 351, so that these gears are normally engaged and these gears are not damaged and no abnormal sound is generated.

In accordance with the above embodiment of the present invention, the apparatus has a function of differential distribution of a drive force and a function of control of a differential rotation, and these functions can be arbitrarily adjusted over a wide range. Further, the amount of change in the design of a carrier casing, etc., can be reduced, the number of parts can be reduced, and the freedom of the design is increased. Moreover, the mechanical rigidity of the apparatus is high, and the noise generated due to vibration can be greatly reduced.

What is claimed is:

1. A power transmission apparatus comprising:
   a first rotary member supported by a cover member for rotation about an axis;
   a second rotary member rotatably supported by the first rotary member for rotation about said axis, said second rotary member comprising first and second mutually coaxial output shafts which can rotate independently from each other;
   frictional engagement means surrounding said axis and disposed radially between the first and second rotary members, said engagement means being responsive to an actuating force applied axially thereto in one direction to transmit power by frictional force between said first and said second rotary members, said frictional engagement means comprising first and second clutch means which selectively transmit power from the first rotary member to the first and second output shafts, respectively, and are adapted to be individually activated;
   drive means for exerting said actuating force, said drive means being mounted on the cover member at a location spaced axially from said engagement means;
   pressing means for transmitting said actuating force from said drive means to said engagement means, said pressing means being mounted on the cover member between said drive means and said engagement means; and
   stopper means arranged on said first rotary member to be engaged by and to provide a reactionary force resisting axial movement of said drive means in a direction opposite to said one direction during exertion of said actuating force.

2. A power transmission apparatus as claimed in claim 1, wherein said first rotary member comprises a differential casing rotatably supported by the cover member through bearing means, and carrying a differential mechanism for transmitting power to two halves of said second rotary member which are adapted to rotate individually, and the frictional engagement means comprises means for restricting the differential of the differential mechanism by the frictional force, said restricting means being disposed within the differential casing, and the pressing means pressing the restricting means to control the frictional force in the differential mechanism.

3. A power transmission apparatus as claimed in claim 2, wherein the restricting means comprises a frictional clutch coupled and decoupled by the frictional force, and the drive means comprises a cylinder and a piston disposed in the cylinder.

4. A power transmission apparatus as claimed in claim 3, wherein the pressing means comprises a pressure ring actuated by the piston, and a push rod for connecting the pressure ring to the frictional clutch.

5. A power transmission apparatus comprising:
a first rotary member supported by a cover member for rotation about an axis;
a second rotary member rotatably supported by the first rotary member for rotation about said axis;
frictional engagement means surrounding said axis and disposed radially between the first and second rotary members, said engagement means being responsive to an actuating force applied axially thereto in one direction to transmit power by frictional force between said first and said second rotary members;
drive means for exerting said actuating force, said drive means being mounted on the cover member at a location spaced axially from said engagement means;
pressing means for transmitting said actuating force from said drive means to said engagement means, said pressing means being mounted on the cover member between said drive means and said engagement means; and
stopper means arranged on said first rotary member to be engaged by said drive means and to provide a reactionary force for opposing all of said actuating force and for isolating said reactionary force from said cover means.

* * * * *